Patented Jan. 12, 1943

2,307,878

UNITED STATES PATENT OFFICE

2,307,878
CRACKING WITH SYNTHETIC CATALYSTS

Gerald C. Connolly, Baton Rouge, La., assignor to Standard Oil Development Company, a corporation of Delaware No Drawing. Application August 12, 1938,
Serial No. 224,491

3 Claims. (Cl. 196—52)

This invention relates to using catalysts for the conversion of hydrocarbon oil and pertains more particularly to using prepared synthetic gel catalyst for the cracking of hydrocarbon oil.

In a prior application, Ser. No. 200,270, filed April 5, 1938, I have described a catalyst specifically adapted for the conversion of hydrocarbon oil formed by combining a silicate solution, such as sodium silicate, with an acid solution of a hydrolyzable salt of alumina under conditions controlled to first form a relatively clear solution containing a mixture of silica and alumina which upon standing sets into a plural hydrogel containing both silica and alumina.

This plural hydrogel according to the above application, is broken into lumps washed free of undesirable salt constituents and then drained and dried to dehydrate the hydrogel and activate the resulting product.

I have now found that catalyst having a high level of efficiency can be prepared by adding alumina in forms other than a hydrolyzable salt during the formation of a hydrous oxide of silicon.

The term hydrous oxide of silicon, as herein employed, is intended to mean an oxide of silicon having a substantial percentage of free water not chemically combined or in solid solution with the silicon oxide. The presence of free water can be determined by low temperature evaporation or by freezing point methods. According to the latter process, the free water freezes out at a temperature not substantially below the freezing point of water. The term is intended to include silica hydrosol, silica hydrogel, gelatinous precipitates of silica or mixtures of the two or more of the above.

According to the present invention the alumina either in a hydrous or non-hydrous form, such as, for example, dry alumina gel, dry gelatinous precipitate of alumina, activated alumina, activated bauxite, alumina hydrogel, hydrous gelatinous precipitate of alumina or other forms of alumina having a pronounced capillary structure is added during the formation of the hydrous oxide of silica, for example, during the formation of silica hydrosol, gelatinous precipitate of silica and or heterogeneous mixtures of silica hydrosol and gelatinous precipitate of silica.

According to the preferred embodiment of my invention, alumina having a capillary structure either in hydrous or non-hydrous form is added during the formation of silica hydrosol. This latter material constitutes an intermediate product in the production of silica gel according to conventional procedure, such as is described for example in the Patrick Patent 1,297,724. According to the general procedure, there outlined, an alkaline solution of a soluble silicate is combined with a dilute acid, preferably confluently and with constant agitation under carefully controlled conditions with respect to temperature and concentrations of reactants, acidity of resulting mixture and other factors to avoid immediate coagulation of the silica.

When conditions are properly controlled, a clear solution of hydrosol of silica results which upon standing for a short period sets into a firm hydrogel.

More specifically, according to the preferred embodiment of the invention, the alumina in any of the various forms heretofore mentioned is added simultaneously with the union of the silicate and acid and the conditions controlled so as to form a clear hydrosol of silica containing the alumina in suspension. The hydrosol upon standing is converted into a hydrogel having the alumina intimately incorporated therein.

The resulting product is thereafter broken into lumps, washed free of alkaline salts and then drained and dried in the conventional manner. The final product may then be used as a catalyst for cracking oil either in granular or molded form. In the cracking operation, the oil to be cracked is passed in contact with the catalyst maintained at cracking temperature, such as from 750 to 950° F. for a period adequate to convert a substantial portion of said oil into lower boiling constituents suitable for motor fuel.

The relative proportions of silica and alumina present in the final catalyst may vary over an extended range without materially effecting the cracking efficiency thereof. Catalysts prepared as above described having a molar ratio of silica to alumina ranging from 2 to 1 to 50 to 1 can be employed with good results although molar ratios of silica to alumina between the limits of from 5 to 1 and 20 to 1 are considered most suitable.

While it is preferred to add the alumina during the formation of the silica hydrosol, the silica hydrosol may be first formed and the alumina then added to the hydrosol before it sets into a hydrogel. Also, the invention in its broader aspects is not restricted to the formation of a clear hydrosol of silica. For example, the alumina in the various forms above described may be added during the formation of a gelatinous precipitate of silica or a mixture of gelatinous precipitate and silica hydrosol.

In other words, it is not essential to the broadest phase of my invention to carefully control the conditions during the union of the soluble silicate with the acid to avoid immediate coagulation of a part or all of the silica. Some of the silica may coagulate and the remainder be retained in solution as a hydrosol or all of the silica may coagulate immediately upon combining the soluble silicate with the acid. For example, the alumina may be added while the soluble silicate or a decomposable salt of silicon is being hydrolyzed with an acid or ammonium chloride, for example, under conditions such that an immediate gelatinous precipitate of silica in admixture with the alumina results.

Having thus described the preferred embodiment of the invention, it will be understood that it embraces such other variations and modifications as come within the scope and spirit thereof.

I claim:

1. A method of cracking hydrocarbon oil which comprises passing the oil to be cracked while at cracking temperature in contact with a silica-alumina catalyst prepared by first forming a silica hydrosol, adding alumina having a capillary structure to said silica hydrosol, converting the hydrosol containing said alumina to a hydrogel, thereafter washing said hydrogel, drying the washed product, and maintaining said oil vapors in contact with said catalyst for a period sufficient to effect the desired conversion.

2. A method of cracking hydrocarbon oil which comprises passing the oil to be cracked while at cracking temperature in contact with a silica-alumina catalyst prepared by combining a solution of a soluble silicate with an acid solution under conditions controlled to form a silica hydrosol, adding alumina having a capillary structure while said soluble silica and acid are being combined, converting the hydrosol containing the added alumina into a hydrogel, washing the hydrogel to remove soluble reaction salts and drying the resulting product, and maintaining said oil in contact with said catalyst for a period sufficient to effect the desired conversion.

3. The method defined by claim 2, wherein the molar ratio of silica to alumina in said catalyst is between 2 to 1 and 50 to 1.

GERALD C. CONNOLLY.